H. E. JOHNSON.
GLASS CUTTING SQUARE.
APPLICATION FILED JUNE 1, 1921.

1,415,650. Patented May 9, 1922.

Witness.
James F. FitzGibbon

Inventor
Henry E. Johnson
By
Attorneys

UNITED STATES PATENT OFFICE.

HENRY E. JOHNSON, OF FORT BRAGG, CALIFORNIA.

GLASS-CUTTING SQUARE.

1,415,650.  Specification of Letters Patent.  Patented May 9, 1922.

Application filed June 1, 1921. Serial No. 474,215.

*To all whom it may concern:*

Be it known that I, HENRY E. JOHNSON, a citizen of the United States, residing at Fort Bragg, in the county of Mendocino, State of California, have invented certain new and useful Improvements in Glass - Cutting Squares; and I do hereby declare the following to be a full, clear, and exact description of the invention, such as will enable others skilled in the art to which it appertains to make and use the same.

This invention relates to new and useful improvements in cutting guides, and particularly to guides for use in cutting sheets of glass.

One object of the invention is to provide a device on which the glass sheet is adapted to be laid, and which is provided with a stop means for one edge of the glass, and means for guiding the glass cutting implement.

Another object is to provide a device of this character wherein the guide for the cutting implement serves as a means for clamping the glass sheet on the device.

Other objects and advantages will be apparent from the following description when taken in connection with the accompanying drawing.

Figure 1:
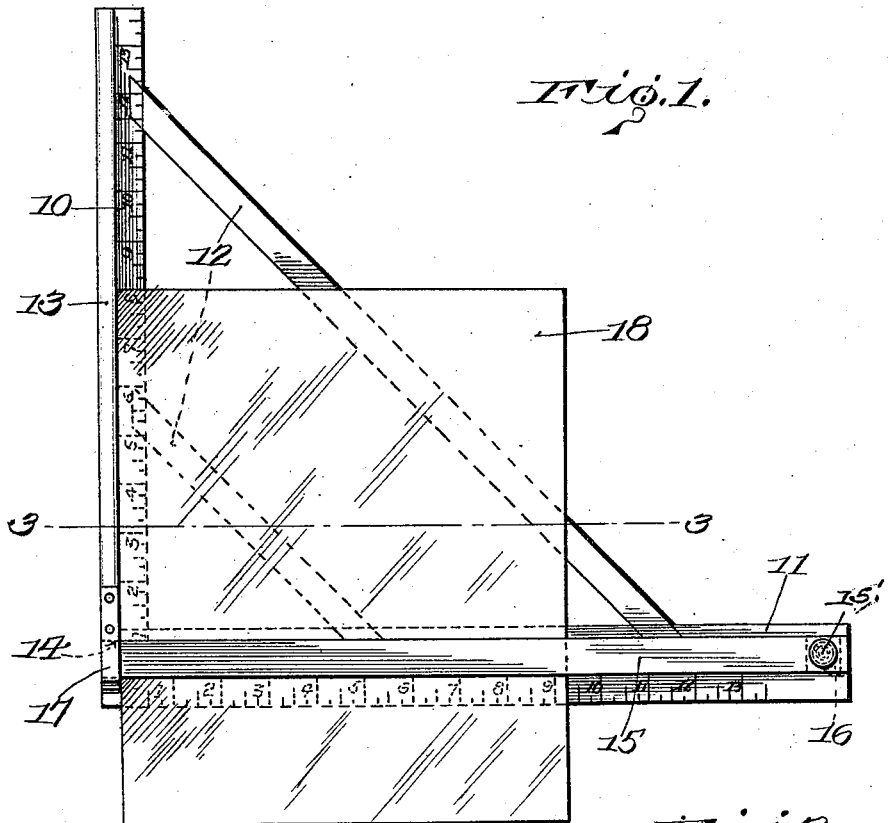
Figure 1 is a plan view of the device, showing a sheet of glass thereon, and in position to be cut.
Figure 2:
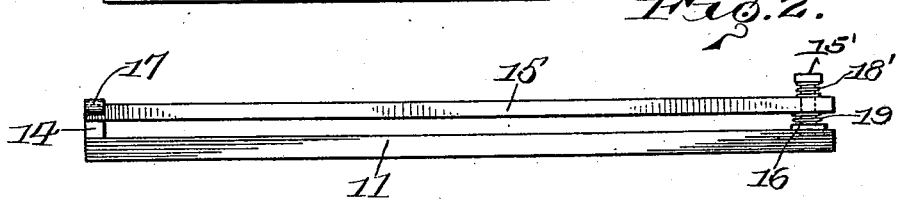
Figure 2 is a side elevation of the device, viewed in a direction to show the movable arm in side elevation.
Figure 3:
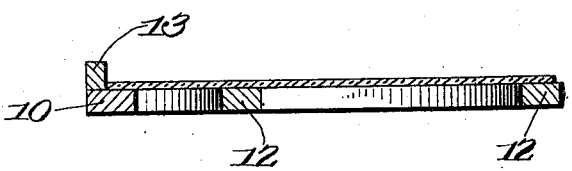
Figure 3 is a sectional view taken on the line 3—3 of Figure 1, which passes in a plane at right angles to the leg of the square which carries the glass stop flange or rib.

Referring particularly to the accompanying drawing there is shown a right angular device including the arms 10 and 11, each of which is marked with inches and fractions thereof. Inclined braces 12 extend between and are secured to the inner edge faces of the arms 10 and 11. The arm 10 is formed with a longitudinally extending and upstanding rib 13, the before-mentioned graduations of the arm being formed inwardly of the rib. The inner end of the rib terminates adjacent the juncture with the other arm 11, to form the stop shoulder 14 for the free end of the arm 15, which is pivotally connected to the upper face of the outer end of the arm 11. A spacing member 16 is, however, disposed between the pivotal end of the arm 15 and the arm 11, so that the arm 15 will lie in spaced relation above the arm 11. Carried by the inner end of the rib is a spring gripping member 17 which is arranged to engage with the free end of the arm 15, to hold the same against the end of the rib.

In the operation of the device, the sheet of glass 18 is placed on the arms and braces, with one edge against the rib 13, and its adjacent outer edge extending beyond the arm 11. It will, of course, be understood that the arm 15 is swung out of the way to permit the placing of the glass on the device. After the glass is properly disposed on the device, the arm 15 is swung onto the upper face of the glass and engaged with the detent 17. It will be noted that graduations begin with 1, at the juncture of the arms 10 and 11, and extend toward the outer ends of the arms. By placing the edge of the glass on the mark of the arm 10, which indicates the length to which the glass is to be cut, the cutter is then drawn along the outer edge face of the arm 15, after which the glass is broken along this line.

Particular attention is called to the stop rib of the arm 10, against which the edge of the glass sheet is held, and that this arm 10 has the graduations whereby the length of the glass can be quickly and accurately measured so that the portion which is to be cut off may be properly slipped from beneath the guiding arm 15.

Attention is also called to the pivoted arm 15, which serves as a guide for the cutter, and also clamps the glass down firmly onto the device, so that the cutting operation can be performed without danger of breaking the glass.

Furthermore, the device is built of such size and dimensions that the sheet of glass will be properly supported, the number of brace arms 12 may be increased or diminished as required by the difference in size of the device.

On the pivot 15', of the arm 15, between the head of said pivot and the upper face of the arm, is disposed a coil spring 18', while a similar spring 19 is disposed on the pivot, between the arm and the spacing member 16. These springs serve to hold the arm 15 elevated in approximately parallel relation to and above the arm 11, of the square, and also serve to hold the arm 15 firmly on the surface of the glass sheets of different thicknesses.

What is claimed is:

A glass support and cutting guide comprising a pair of right-angularly connected arms, oblique braces between the arms, the arms and braces being adapted to support a sheet of glass to be cut, one of the arms having a vertical longitudinal stop rib for one edge of the glass, both of the arms having graduations, the inner end of the rib terminating adjacent the inner edge face of the other arm, a cutter guiding arm pivotally connected to the outer end of said other arm, and a detent carried by the said inner end of the rib for gripping engagement with the free end of the pivoted arm, to releasably hold the arm against the end of the rib and the glass on the angularly connected arms and braces.

In testimony whereof, I affix my signature, in the presence of two witnesses.

HENRY E. JOHNSON.

Witnesses:
H. F. MILLIKEN,
ROY SWITZER.